(12) United States Patent
Tortosa

(10) Patent No.: US 10,232,317 B2
(45) Date of Patent: *Mar. 19, 2019

(54) PERMEATE TUBE AND RELATED METHODS

(75) Inventor: Pedro J. Tortosa, Houlton, WI (US)

(73) Assignee: COTT TECHNOLOGIES, INC., La Puente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/373,706

(22) Filed: Nov. 28, 2011

(65) Prior Publication Data

US 2012/0111783 A1  May 10, 2012

Related U.S. Application Data

(63) Continuation of application No. 11/984,381, filed on Nov. 16, 2007, now Pat. No. 8,070,088.

(51) Int. Cl.
*B01D 63/10* (2006.01)
*B23K 11/00* (2006.01)
(Continued)

(52) U.S. Cl.
CPC .......... *B01D 63/10* (2013.01); *B01D 2313/12* (2013.01)

(58) Field of Classification Search
CPC .................. B01D 29/111; B65H 19/2276; B65H 75/242; B65H 18/00; B65H 18/28; B65H 75/241
(Continued)

(56) References Cited

U.S. PATENT DOCUMENTS

| 1,973,980 A | 2/1933 | Graffenberger |
| 3,367,505 A | 2/1968 | Bray |

(Continued)

FOREIGN PATENT DOCUMENTS

| FR | 2848272 A1 * | 6/2004 | ........... B65H 75/185 |
| GB | 2293225 A * | 3/1996 | ............. B65H 75/08 |

(Continued)

OTHER PUBLICATIONS

Krahe, Martin, Ullmann's Encyclopedia for Industrial Chemistry, article entitled "Biochemical Engineering," pub. Wiley-VCH Verlag GmbH & Co. KGaA, 2002.*

(Continued)

*Primary Examiner* — Bobby Ramdhanie
*Assistant Examiner* — Denise R Anderson
(74) *Attorney, Agent, or Firm* — Breneman & Georges

(57) ABSTRACT

A novel positive traction permeate tube and fittings therefor are described for use in spirally wound membrane filtration elements for filtration and separation applications. Membrane filtration elements incorporate the novel permeate tube. Methods of making the novel positive traction permeate tube are also disclosed, as are the preferred sanitary stainless steel materials used for the sanitary tube and fittings. The novel permeate tube involves a sanitary tubing having two open ends, each with an end fitting. The end fittings engage a positive traction drive for high tension spiral winding of a membrane element spirally around the novel permeate tube. Membrane filtration elements made with the novel permeate tube are less subject to slippage and breakage during manufacture and can withstand higher pressure drops and flow rates during use without failure of the spirally wound membrane element. The positive traction permeate tube facilitates membrane replacements.

21 Claims, 11 Drawing Sheets

(51) Int. Cl.
*F16L 13/02* (2006.01)
*B01D 69/00* (2006.01)

(58) Field of Classification Search
USPC .................................................. 242/598, 599
See application file for complete search history.

(56) References Cited

U.S. PATENT DOCUMENTS

| | | | | |
|---|---|---|---|---|
| 3,680,806 | A | * | 8/1972 | Obermaier ............ B65H 75/30 |
| | | | | 242/611.2 |
| 3,708,069 | A | * | 1/1973 | Clark ........................... 210/181 |
| 3,759,459 | A | | 9/1973 | De Graffenreid et al. |
| 4,001,198 | A | | 1/1977 | Thomas |
| 4,021,351 | A | | 5/1977 | Bray |
| 4,033,878 | A | | 7/1977 | Foreman et al. |
| 4,792,401 | A | | 12/1988 | Truex et al. |
| 4,906,372 | A | * | 3/1990 | Hopkins ................ B01D 63/10 |
| | | | | 210/321.74 |
| 5,227,063 | A | * | 7/1993 | Langerak et al. ....... 210/321.78 |
| 5,817,235 | A | | 10/1998 | Tortosa |
| 6,068,771 | A | | 5/2000 | McDermott et al. |
| 6,126,819 | A | * | 10/2000 | Heine et al. ................... 210/139 |
| 7,051,971 | B2 | * | 5/2006 | Takeda et al. ............. 242/578.2 |
| 8,070,088 | B2 | | 12/2011 | Tortosa |
| 2006/0016150 | A1 | * | 1/2006 | Fournier .................... 52/745.17 |

FOREIGN PATENT DOCUMENTS

| | | | | | |
|---|---|---|---|---|---|
| GB | | 2435028 A | * | 8/2007 | ........... B65H 75/185 |
| WO | WO2006043884 A1 | | * | 4/2006 | ............. B01D 63/10 |

OTHER PUBLICATIONS

Ullmann's Encyclopedia of Industrial Chemistry; Biochemical Engineering; Martin Krahe, Bioengineering AG, 8636 Wald, Switzerland, Article online posting Date: Jan. 15, 2003.

* cited by examiner

PERMEATE TUBE AND RELATED METHODS

CROSS REFERENCE TO RELATED APPLICATIONS

This application is a continuation of Ser. No. 11/984,381, filed Nov. 16, 2007, now U.S. Pat. No. 8,070,088.

STATEMENT REGARDING FEDERALLY SPONSORED RESEARCH OR DEVELOPMENT

Not applicable.

INCORPORATION-BY-REFERENCE OF MATERIAL SUBMITTED ON COMPACT DISC

Not applicable.

REFERENCE TO A "MICROFICHE APPENDIX"

Not applicable.

BACKGROUND OF THE INVENTION

1. Field of the Invention

The invention pertains to a novel positive traction permeate tube and a method of making the novel positive traction permeate tube for utilization with spiral wound membrane elements used in pressurized membrane filtration, including microfiltration, ultrafiltration, nanofiltration and reverse osmosis. The invention pertains especially to novel compositions, structures and configurations for the positive traction permeate tube in a membrane filtration element and to devices and procedures for spirally winding a membrane element about a substrate permeate tube of stainless steel, or other suitable materials, cut to precise final length prior to winding and using positive traction during winding thus providing enhanced reliability of the finished spiral-wound membrane element. The novel positive traction permeate tube prevents system failure and destruction of the spiral wound membrane filtration element through breakage, channeling and unwinding thereof at higher fluid pressure drops and higher liquid feed flow rates associated with high viscosity retentates in membrane filtration processes.

2. Description of Related Art Including Information Disclosed Under 37 CFR 1.97 and 1.98

In a spiral wound membrane filtration element, a permeate tube is arranged at the center of the spirally wound membrane element. The permeate passes through the membrane on each side of the wound membrane leaves, then along the permeate carrier inside the membrane leaves and then through perforations in the permeate tube into the interior of the center of the permeate tube. It is through the center of this permeate tube that the permeate fraction can leave the membrane element. Thus the central tube in a spirally wound membrane filtration element is called a "permeate tube." The permeate leaves the element via the permeate tube and the retentate can be passed on to another membrane filtration element to increase further the concentration of high molecular weight compounds in the retentate by extracting more permeate from the feed stream through a subsequent membrane element.

Further, for critical applications such as pharmaceutical and dairy operations, the permeate tube must be free from bacteria traps. Spiral wound membrane elements, such as those used in the dairy field for the separation of whey, are subject to a cleaning operation after periods of use, generally by the use of chemical cleaning solutions, such as caustics, detergents, chlorine, or combinations thereof, and are thereafter rinsed with clean water.

There are many different configurations for membrane filtration elements but the vast majority of membrane filtration systems have spirally wound membrane elements. Other configurations of membrane elements are tubular membranes, hollow fiber membranes and flat sheet membranes. Membrane filtration elements comprising spiral wound membranes and their construction are well known and are illustrated, for example, in U.S. Pat. Nos. 3,367,505, 4,033,878, and 4,792,401. A spiral wound membrane element generally comprises one or more laminate leaf assemblies of semipermeable membrane sheet and optionally other materials. These leaf assemblies are each arranged so that the feed liquid is carried over the membrane surface while permeate is carried through to a central permeate collection tube. The step of spirally winding the membrane onto a central tube is well known and demonstrated, for example, by Bray, U.S. Pat. No. 4,021,351.

Spiral wound membrane elements are a widely used membrane configuration in present day sanitary membrane filtration applications. Such membrane elements are installed inside elongated pressure vessels which may contain one or a series of up to six membrane elements or more. A high pressure feed stream enters the vessel through its inlet port at one end of the vessel and exits through its outlet port at the opposite end. The linear speed and high pressure drop is substantial, thereby posing a threat to the integrity of the membranes.

In the pharmaceutical, food & beverage, and biotech industries, contamination-free processing is critical. The integrity of the sanitary manufacturing equipment is essential for full compliance with the validation process. The potential for contamination increases with the introduction of peripheral components, such as filtration and temperature and pressure measuring instrumentation required to ensure process parameters remain within acceptable limits. As a result, these inline devices must themselves meet standards set by governing agencies to ensure there are no weak links in the sanitary chain.

The two most common of these standards include: (1) the "3A" standard promulgated by 3A Sanitary Standards, Inc. (3A SSI), a non-profit association representing equipment manufacturers, processors, regulatory sanitarians and other public health professionals. 3A Sanitary Standards and 3A Accepted Practices pertain to dairy and food processing equipment, and focus on sanitary design, materials, and surface finish; and (2) the "FDA-Approved" standard promulgated by the United States Food & Drug Administration (FDA), a federal agency that regulates all food processing and drug manufacturing in the U.S. It sets and enforces standards and government codes.

Most spiral-wound membrane elements now manufactured are rolled over a permeate tube made of plastic material, commonly polysulfone. In the prior art, a conventional torque force is applied in winding a spiral wound membrane element around a polysulfone tube. Plastic permeate tubes used in conventional manufacturing processes are longer than the tubes found in finished membrane elements as the original length of tube is cut to size after applying the spiral wound membrane to the substrate tube. A conventional spiral wound tube membrane filtration element is shown in FIG. 1. The wound element 10 involves a plastic permeate tube 11 having at least one notch 15 on one end for engaging a drive system, not shown, to wind the permeate tube 11 around which a membrane element 12 is wound under a conventional tension. The prior art permeate tubes are subject to mechanical slippage and breakage while winding the membrane element. Unlike the prior art, the permeate tubes of the present invention do not slip or break because they provide positive traction through an interlocking means, as will be discussed in greater detail in the Summary of the Invention.

The driving force required to roll the elements in a prior art permeate tube is applied to the ends of the permeate tube 11 by inserting a rolling machine chuck into the notch 15 cut at the end of the tube 11 as shown in FIG. 1. The notches 15 are eliminated with the excess length of the membrane element 12 and the plastic permeate tube 11 when the assembly is cut to its final length as shown in FIG. 2.

The entire assembly is cut at the ends, typically using a saw or other cutting means, to allow for placement in a membrane filtration vessel and so that the ends of the cut plastic permeate tube 11 may engage other elements in filtration vessel, by means of interconnectors or ATDs (Anti Telescoping Devices). Unlike the prior art, the invention does not cut the tube to length after wrapping but instead utilizes a tube of the desired precise length and positively wraps the membrane leaves to the final tube as will be discussed in greater detail in the Summary of the Invention.

For example, Bray, U.S. Pat. No. 4,021,351, teaches a membrane cartridge that is spirally wound around an injection-molded plastic permeate collection tube having transverse slits or tongue extensions at the end. The permeate tube can be made up of a plurality of interlocking plastic pieces mated with each other through the transverse slits or tongue extensions at the end of each tube segment. The membrane materials are then spirally wound upon the interlocking pieces of plastic permeate tube to form a membrane element.

In membrane filtration processes involving high viscosity retentate, the required higher fluid pressure drop and higher flow rates involved can cause channels to form between membrane layers while a filtration element is in use. This can occur at any time, and sometimes after only a few seconds of use under high pressure drop and high flow rate. "Channeling" is especially prevalent in spiral wound membrane elements for ultrafiltration of high viscosity retentate in partially filtered dairy liquids when the membrane element is wound about the permeate tube under conventional winding tensions, thus causing failure in the spirally wound membrane element while in use.

To avoid this failure, higher winding tensions are required in winding the membrane element to the permeate tube. However, when a membrane filtration application requires that the membrane element be rolled under higher than conventional winding tension, the prior art plastic permeate tubes tend to break, especially at the notches, thus causing unacceptable waste in the manufacturing process.

Changing only the composition of the permeate tube to stainless steel, instead of polysulfone, avoids the problem of breaking the tubes but introduces a new problem: cutting off the ends of the membrane element, including the stainless steel permeate tube, produces elements with too big variation of finished length as well as irregular end-faces of the tube. Cutting the stainless steel permeate tubes, of prior art design, before winding the elements leaves the tube without the slots at its ends and without positive traction. The driving force required for winding is reduced to whatever friction is available between the interior of the prior art stainless steel permeate tube and expanding chucks inserted at the ends of the tube and attached to the drive system of the rolling machine. This configuration results in slippage when the element is rolled under higher than conventional winding tension.

In conventional prior art tubes, failure due to slippage or breakage occurs at greater frequency as the winding tension is increased. Further, in the prior art little or no attention has been given to measuring torque or slippage in wrapping the membrane element and nothing known has been done to provide an accurate means of controlling and measuring torque or the tightness of the spiral wrap.

A positive traction substrate permeate tube of precise length and end-faces is needed that can withstand high torque and function under precise mechanical control that permits high tension winding in the production of a spiral wound membrane element without the substrate permeate tube slipping or breaking, and can withstand the pressure forces exerted on the tube while winding the membrane element and the high pressure drop and endure the high fluid flow conditions while in use in a filtration element.

SUMMARY OF THE INVENTION

As previously discussed the invention provides a novel permeate tube having a different composition, structure and configuration than the prior art permeate tubes to provide a novel substrate for spiral wound membrane elements for pressurized membrane filtration. The novel permeate tube is designed for winding a membrane element around the tube under positive traction providing for high tension membrane winding in a controlled, measurable and repeatable operation, to produce a permeate tube with the tightness of the membrane element controlled by vacuum, positive traction fittings and the drive bar while securing a precise finished length of the membrane element.

The characteristics of the permeate tube of the present invention are: (a) the tube is stainless steel allowing high tension winding with positive traction and (b) the positive traction permeate tube is machined to precise length prior to winding of the membrane element there over. These characteristics (a) preserve the integrity of the element and (b) allow the seal of the ATD to be very close to the end of the permeate tube, thus securing good cleaning, even with high viscosity retentates.

The novel permeate tube can undergo high tension winding of the membrane element without any tube breakage or slippage during high tension winding. In addition, the novel permeate tube is prepared from components manufactured under precise size tolerances in order that the novel permeate tube may be utilized as a finished component directly in the manufacturing of a membrane filtration element.

Unlike the prior art, the novel positive traction permeate tubes of the invention are not cut to size after winding the membrane element. The components of the novel positive traction permeate tube are designed with precise tolerances as to size prior to assembly into the novel positive traction permeate tube structure, as well as after the assembly, thereby abating any need to cut or saw the novel permeate tube to a shorter length after the membrane element is wound around the tube. Having permeate tubes of precise finished length is essential to secure that all unions between permeate tubes and adjacent interconnectors-ATDs place the sealing devices (O-ring, leap seal, etc) very close to the end of the permeate tube, a condition required to effectively clean the inside of the permeate tube comprised between its end and the sealing device. This is especially important in cases of high viscosity retentates.

It is an object of the invention to provide an interlocking means on the ends of the finished tube for making spiral wound membrane elements under high tension winding using positive traction in which the torque in the wrapping of the spiral wound membrane leaves can be precisely controlled and the tightness of the spiral wrapped membrane leaves can be controlled. It is another object of the invention to provide a novel permeate tube that distributes the stress on the central sanitary tubing during high tension winding without slipping or breaking. It is yet another object of the invention to provide a novel permeate tube that is not subject to slippage and breakage under high torque and vacuum conditions during the membrane element winding process.

It is yet another object of the invention to provide a permeate tube that enables production of a spiral wound membrane filtration element that can withstand higher fluid flow rates and higher fluid pressure drop without substantial channeling, unwinding or other failures in the spiral wound membrane element during high fluid pressure drop and high fluid flow in a membrane filtration process involving high viscosity retentate separation by providing a spiral wrapped membrane on the permeate tube substrate with a controlled torque and wrap tightness.

A positive traction permeate tube comprises (A) a substantially cylindrical sanitary tubing having a first open end, a second open end, a sanitary tubing wall defining a sanitary tubing interior and substantially circular sanitary tubing exterior, a sanitary tubing longitudinal axis and a plurality of perforations in the sanitary tubing wall providing access to the sanitary tubing interior; (B) a first fitting at said first open end and having a longitudinal axis, said first fitting being affixed contiguous with the first open end of the sanitary tubing such that the longitudinal axis of the sanitary tubing and the longitudinal axis of the fitting are parallel and coincident, said first fitting having a longitudinal opening cut through a solid piece of said first fitting, the longitudinal opening defined by at least one surface against which an applied force produces a moment of force having a vector perpendicular to and displaced from the longitudinal axis of the sanitary tubing and the parallel and coincident longitudinal axis of the fitting when affixed contiguously with the first open end of the sanitary tubing; and (C) a second fitting at said second open end and having a longitudinal axis; said second fitting being affixed contiguous with the second open end of the sanitary tubing such that the longitudinal axis of the sanitary tubing and the longitudinal axis of the second fitting are parallel and coincident, the second fitting having a longitudinal opening cut through a solid portion of the second fitting, the longitudinal opening defined by at least one surface against which an applied force produces a moment of force having a vector perpendicular to and displaced from the longitudinal axis of the sanitary tubing and the parallel and coincident longitudinal axis of the second fitting when affixed contiguously with the second open end of the sanitary tubing.

Referring to the inside and outside cross-section of the permeate tube: (A) the inside cross section of the permeate tube can have any shape in the central tubing and inside end of the fittings (the opening for positive traction) but it must be circular on the outside ends of the fittings to allow the connection and seal with the ATDs; and (B) the outside cross section of the permeate tube must be circular along the entire length of the permeate tube because the membrane element, wound on the permeate tube, must be substantially cylindrical to obtain a tight fit inside the pressure vessel that houses the permeate tube.

In a preferred embodiment of the invention, the permeate tube is comprised of a 316L stainless steel central tubing with fittings at either end. The fittings are made of the same 316L stainless steel material as the sanitary central tubing. The fittings are of cylindrical shape, having an outside diameter equal to the outside diameter of the central tubing and a length of 2 inches. The length of the fittings is not critical. In fact the fitting affixed to either end of the central tubing may be of different length. The length of the permeate tube is the sum of the length of the central tube and the lengths of the fittings affixed on the ends of the central tube.

Referring to the structure of the fittings, each fitting has two ends: the interior end is adapted to be butt-welded to one of the ends of the central sanitary tubing; the exterior end serves as one end of the finished permeate tube. When both fittings have been welded to the opposing ends of the central sanitary tubing the permeate tube perforations are made and the permeate tube is ready to wrap with a membrane element. Each end of the fitting has a face defined by a plane perpendicular to the axis of the fitting. The interior end has the same dimensions as the sanitary tubing end to which it is butt-welded; including outside diameter and wall thickness.

The exterior ends of the fittings have a cylindrical opening, coaxial with the fitting, with a thicker wall than the interior end, having in the preferred embodiment an inside diameter of 1.318 inches for an 8" membrane element, which provides the cylindrical inner surface required to accept an ATD with a sealing device (O-ring, leap seal, etc.). Both ends have cylindrical openings coaxial with the fitting and both openings are shorter than the fitting itself. The section of the fitting between the openings at both ends of the fitting has an opening, also coaxial with the fitting. This central opening is preferably hexagonal (or any other polygonal shape) and provides the surfaces to engage a driving bar. Configurations other than polygonal configurations are suitable for the central opening provided they are capable of achieving positive traction by engaging a drive bar.

One characteristic of this positive traction permeate tube that constitutes an important improvement over the prior art is that the fittings provide positive traction. The intermediate section of the fitting with the opening of hexagonal or polygonal shape remains in the tube after the membrane element is exhausted, thus the positive traction permeate tube is re-usable, maintaining the original capability of positive traction. When the membrane element becomes too old, the membrane leaves can be scraped off, the stainless steel tube cleaned and the permeate tube is then ready to be used again, just like new, to roll a new membrane element.

The number and disposition of perforations in the permeate tube is not critical. A suitable arrangement utilizes a limited number of perforations in four longitudinal rows to allow the passage of permeate into the permeate tube center when the novel positive traction permeate tube is operative within a membrane element. The number of perforations is limited to assure that the permeate tube can withstand high torque conditions and pressure conditions in wrapping under a vacuum. The perforations may be arranged in two sets of opposing rows for a total of four rows displaced 90 degrees from each other.

Positive traction permits the membrane elements to be wound around the novel permeate tubes at higher winding tensions without having the permeate tube slip. Positive traction is distinguishable from the prior art in that the interlocking means permit precise control at high tension winding without breakage as found in making spiral wound membrane elements with prior art plastic permeate tubes or without slippage as found in making spiral wound membrane elements with prior art stainless steel permeate tubes not having positive traction interlocking. A positive traction permeate tube allows membrane elements to be wound at sufficiently high tension without unacceptable breakage during manufacture when compared with the slippage or breakage that occurs in making membrane filtration elements using prior art plastic permeate tubes or non-interlocking stainless steel tubes, wound under similarly high tensions.

316L stainless steel is a most preferred sanitary stainless steel. This material provides good machining, good welding and corrosion-resistance attributes in addition to having the ability to be polished to a mirror finish. Sanitary tubing made of 316L stainless steel is a standard tubing which is already polished from the factory. 316L stainless steel tubing is the standard in the industry and meets the sanitary requirements necessary for permeate tube applications. Accordingly, in fabricating the positive traction permeate tube of the present invention the sanitary tubing available in the market which complies with 3A Sanitary Standards is used. Sanitary end fittings, manufactured to the same 3A Sanitary Standards are then welded to each end of the sanitary tubing. Welding is effected using automatic orbital equipment that produces a full penetration butt-weld with a clean bead on both the exterior and interior surface of the weld. No further grinding or polishing is required. The resulting weld meets the requirements for sanitary systems. The tubing and sanitary fittings must be composed of the same stainless steel alloy in order for the penetration butt-weld to form the required clean bead on both the interior and exterior surface of the weld.

After both ends of the tube are welded to positive traction fixtures, an 80 grid emory cloth is preferably applied to the outer surface of the tubes, on the glue zone proximate the tube ends, to roughen the surface in order to secure good binding of the glue used to set the membrane leaves in place. As noted, after welding both fittings to the sanitary tubing, the exterior surface of the fittings plus an additional two inches of the tubing on each end are roughed up using an emery cloth (80 grid) to secure good adhesion of glue used to adhere the membrane leaves to the permeate tube. Membrane element wrapping utilizing the positive traction permeate tube enables management and control of torque and facilitates trim of the membrane at each of the ends of the permeate tube. Moreover, when membrane replacement is required, the positive traction permeate tube can be re-used by removing the spirally wrapped membrane, cleaning the permeate tube and wrapping new membrane on the positive traction permeate tube.

The term "sanitary" when used herein to describe the tubing and fittings means that the described components of the permeate tube meet the 3A Sanitary Standards for sanitary applications. The term positive traction which is used to characterize the permeate tube of the present invention relates that the architecture of the permeate tube includes means for engaging a driving bar without slippage. Of note in the present invention, the circumference of the fittings and the sanitary tube are the same and after the fittings are affixed to the tube using butt-welding with full penetration a clean bead is produced on the interior which does not require any polishing according to 3A Sanitary Standards.

BRIEF DESCRIPTION OF THE DRAWINGS

The foregoing features of the invention will become more apparent from the detailed description of the invention and disclosure of the best mode in conjunction with the accompanying drawings in which.

DETAILED DESCRIPTION OF PREFERRED EMBODIMENTS INCLUDING BEST MODE

According to the preferred embodiment and best mode, a positive traction permeate tube for spiral wound membrane elements is made from sanitary stainless steel components. Positive traction is distinguishable from the prior art in that the interlocking means at the ends of the tube permit precise control at high tension winding without slippage or breakage as found in making spiral wound membrane elements with prior art plastic permeate tubes or non-positive traction stainless steel tubes. As heretofore noted in accordance with the prior art, in making spiral wrapped membranes with stainless steel permeate tubes, expanding chucks are inserted at the ends of a perforated stainless steel tube and attached to the drive system of a rolling machine. When conventional winding tensions are exceeded, slippage occurs. A positive traction permeate tube allows membrane elements to be wound at sufficiently high tension without unacceptable breakage during manufacture when compared with the slippage or breakage that occurs in making filtration elements using prior art plastic permeate tubes or non-positive traction stainless steel tubes, wound under similarly high tensions.

Other materials having some or all of the desirable properties of sanitary stainless steel, such as other metals, especially austenitic and other materials that can withstand torque forces generated by providing positive traction are known by those of ordinary skill in the art. In the most preferred embodiment the novel positive traction permeate tube is made from 316L sanitary stainless steel. In another embodiment, the novel positive traction permeate tube is made from 304 sanitary stainless steel.

Figure 1:
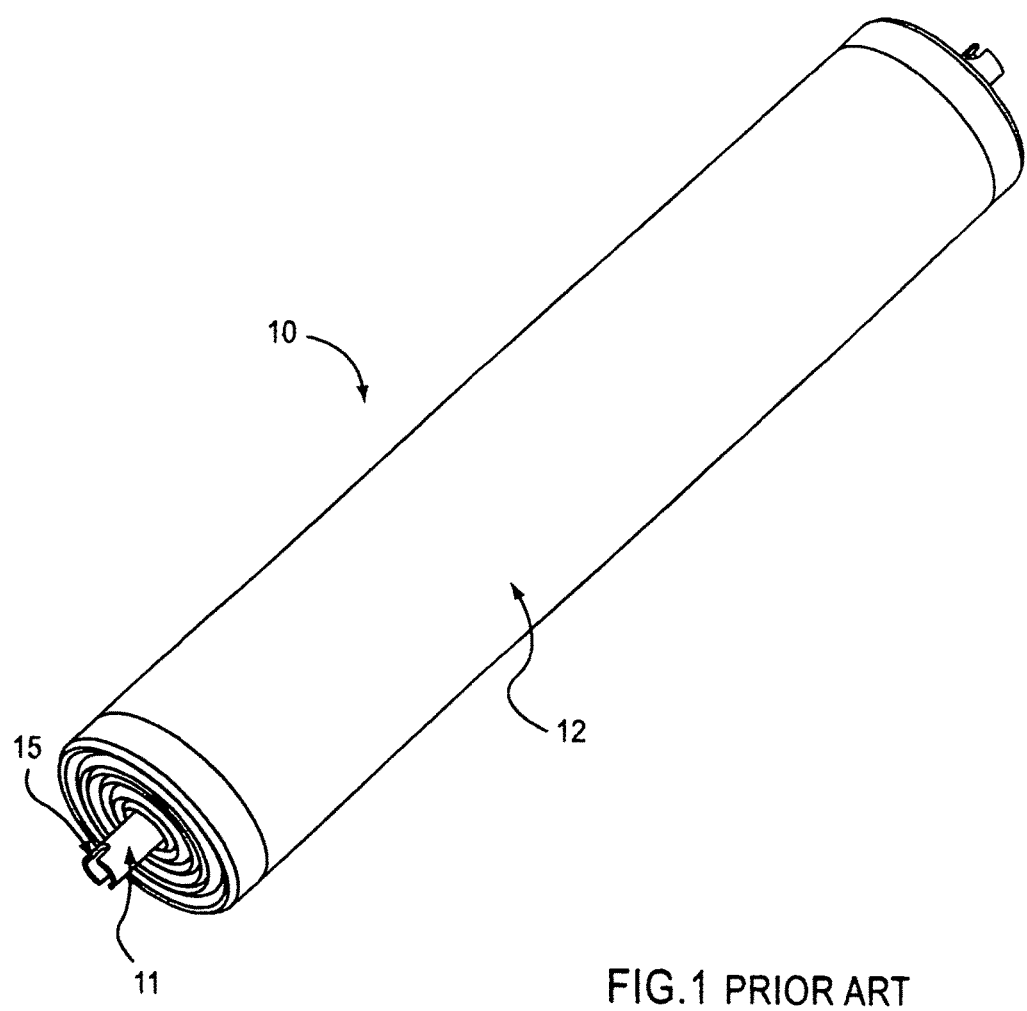
FIG. 1 is a perspective view of a prior art spiral wound membrane element with a plastic permeate tube, before being cut to length.
Figure 2:
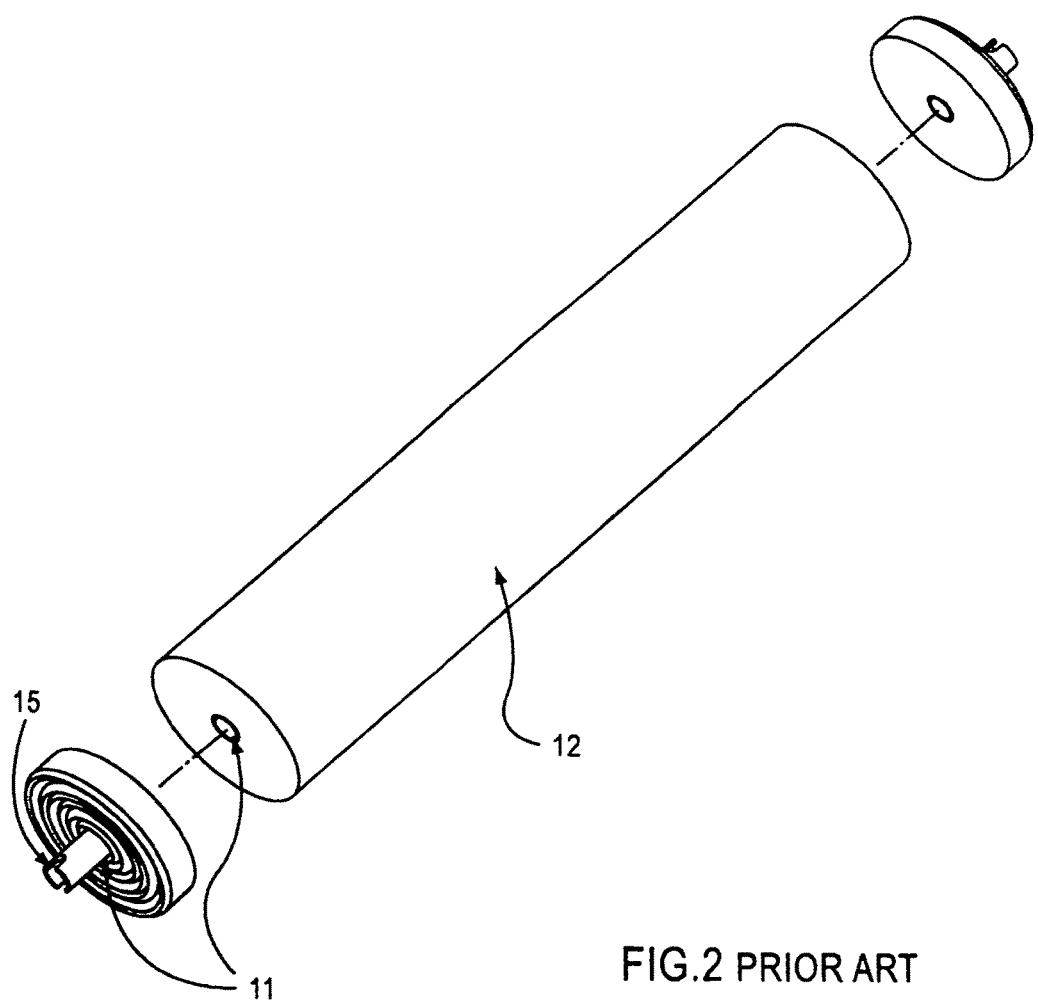
FIG. 2 is an exploded view of the prior art spiral-wound membrane element with a plastic permeate tube of FIG. 1 after being cut to final length and the two tips removed to be discarded.
Figure 3:
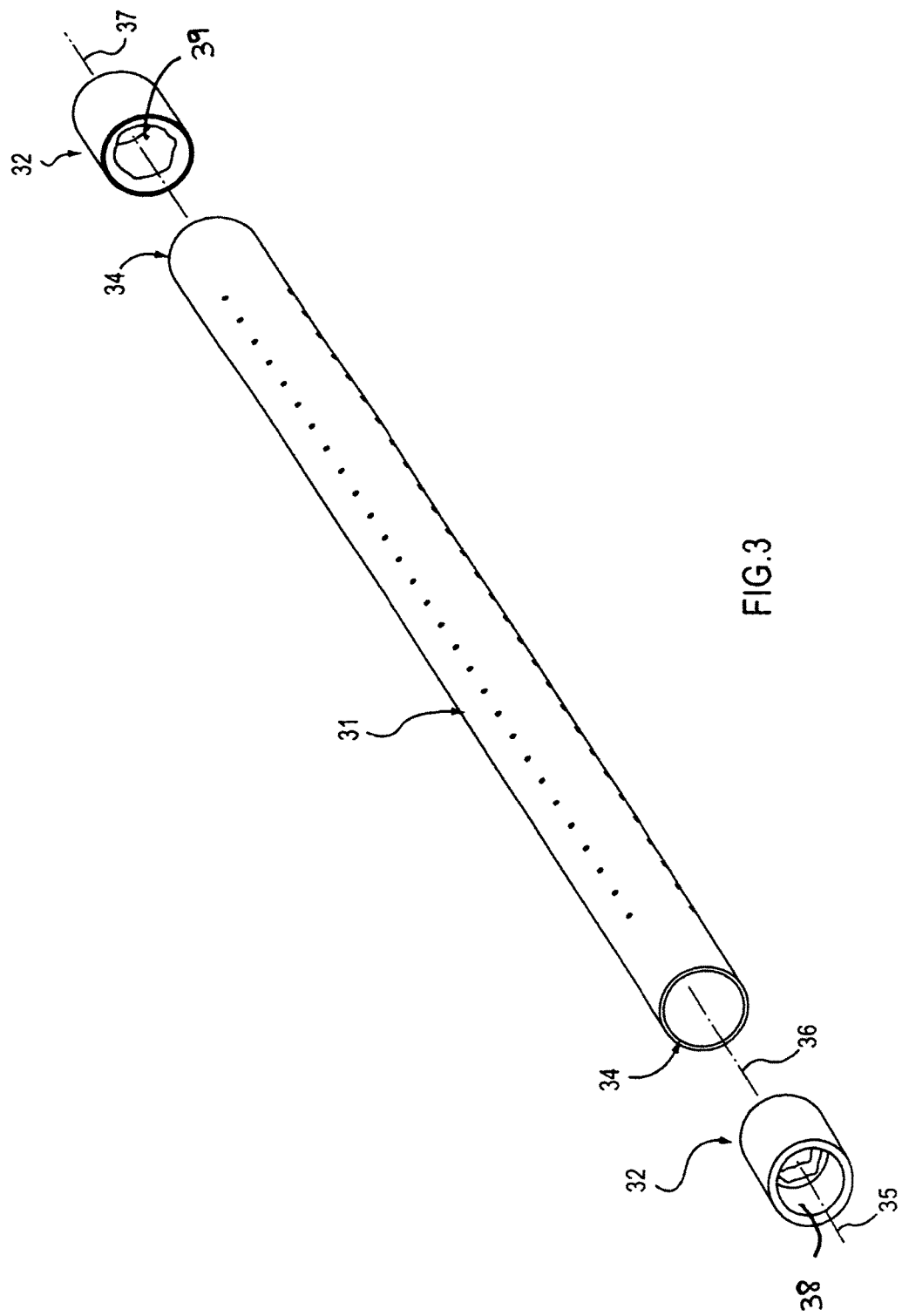
FIG. 3 is a perspective exploded view of the components of the novel permeate tube of the invention.
Figure 4:
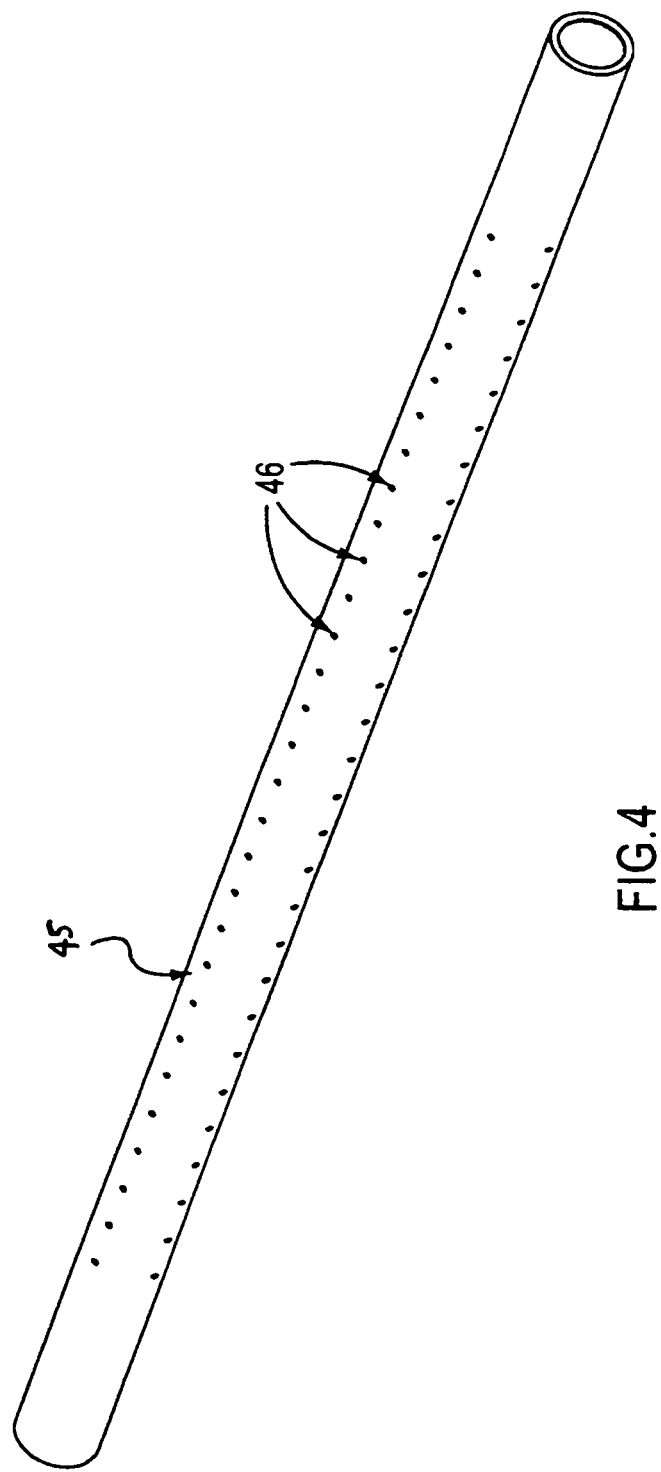
FIG. 4 is a perspective view of an assembled novel permeate tube constructed in accordance with the preferred embodiment of the invention.

The novel permeate tube, according to the preferred embodiment and best mode, is manufactured from three components as demonstrated in FIG. 3. One of the three components is a central sanitary tubing 31. The other two components are specially manufactured tubular end fittings 32, one for each end 34 of the sanitary tubing 31. The fittings 32 are required at each end 34 of the central sanitary tubing 31 in order to provide the sealing surface to receive the interconnector-ATD with an O-ring or lap seal. Central longitudinal axes 35, 36 and 37 of the first fitting 32 with a first opening 38, the tubing 31 and the second fitting 32 with a second opening 39, respectively, are parallel and coincident. Each fitting 32 is a positive traction device having an anti-telescoping device opening. One fitting 32 has the first opening 38, the other fitting 32 has the second opening 39. When assembled together by full penetration butt-welding, as shown in FIG. 4, these three components together constitute a novel permeate tube 45, according to the most preferred embodiment of the invention. The outer cross-section of the permeate tube 45 is substantially circular because the membrane element must be "substantially" cylindrical in order to provide a good fit inside a pressure vessel that houses the membrane element.

In an example of the most preferred embodiment and best mode there is a finished tube length of 38.000 inches, an outer diameter of 1.50 inches, an inner diameter of 1.138 inches at the ends, having a length of the end fitting of 2.00 inches, a wall thickness in the mid-section sanitary tubing of 0.065 inches, having 29 perforations in each of four rows, with a perforation diameter of 0.125 inches, a distance between the perforations of 1.00 inches, and a hexagonal longitudinal hole of approximately 0.945 inches across to accept a $15/16$" hexagonal central bar (0.9375 inches across). In an example of another embodiment there is a tube length of 38.000 inches, an outer diameter of 2.50 inches, an inner diameter of 2.250 inches, having a length of the end fitting of 2.00 inches, a wall thickness in the mid-section sanitary tubing of 0.065 inches, having 39 perforations in each of four rows, with a perforation diameter of 0.188 inches, a distance between the perforations of 0.75 inches, and a hexagonal longitudinal hole of approximately 1.908 inches across to accept a $1 7/8$" hexagonal central bar (1.875 inches across). In other embodiments there is a tube length of 10-60 inches, an outer diameter of 0.75-2.50 inches, an inner diameter of 0.25-2.25 inches, having a length of the end fitting of 0.5-3.00 inches, a wall thickness in the mid-section sanitary tubing vessel of 0.040-0.080 inches, having 15-50 perforations with a perforation diameter of 0.10-0.25 inches, a distance between the perforations of 0.50-2.50 inches, and a hexagonal longitudinal hole of approximately 0.65-1.30 inches across to accept a hexagonal central bar 0.60-1.28 inches across.

Figure 5:
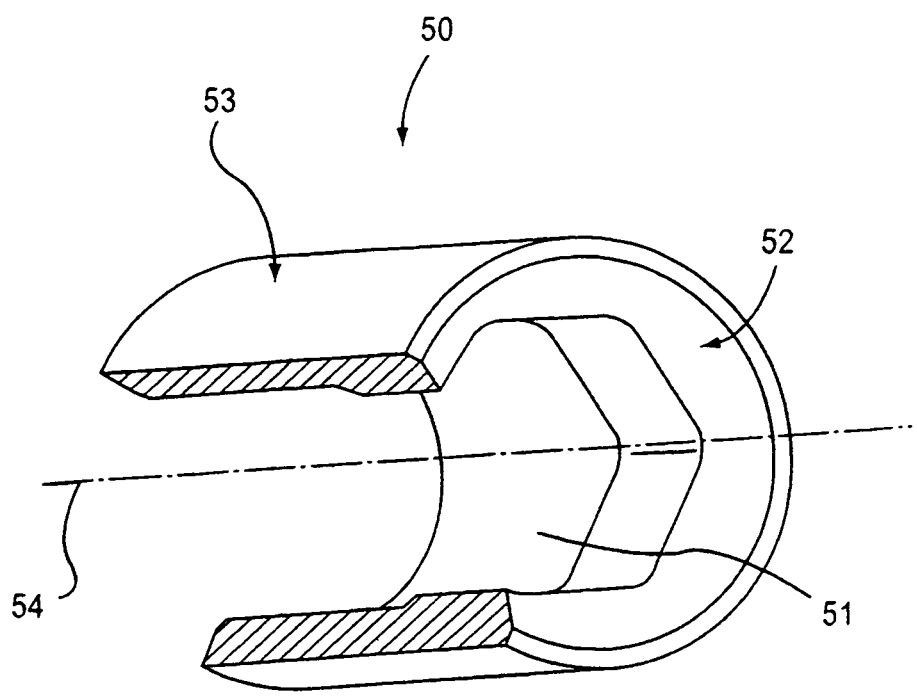
FIG. 5 is a perspective view partly in section of a tubular end fitting for the novel permeate tube of FIG. 4.

In the preferred embodiment and best mode, the tubular end fittings are machined from a cylinder of sanitary stainless steel, also type 316L, and each tubular end fitting has the same outer diameter as the outer diameter of the central sanitary tubing to which each end fitting will be affixed. As demonstrated in FIG. 5, a finished tubular end fitting 50 has a longitudinal opening 51 through a solid metal piece 52 perpendicular to an outer wall 53 and a longitudinal axis 54 of the fitting 50 so that the opening si can provide longitudinal access into the interior of a positive traction permeate tube. In the most preferred embodiment, this opening 51 is machined or cut from the solid metal piece 52 or a hollow bar prior to joining the end fitting to the central sanitary tubing.

Figure 6:
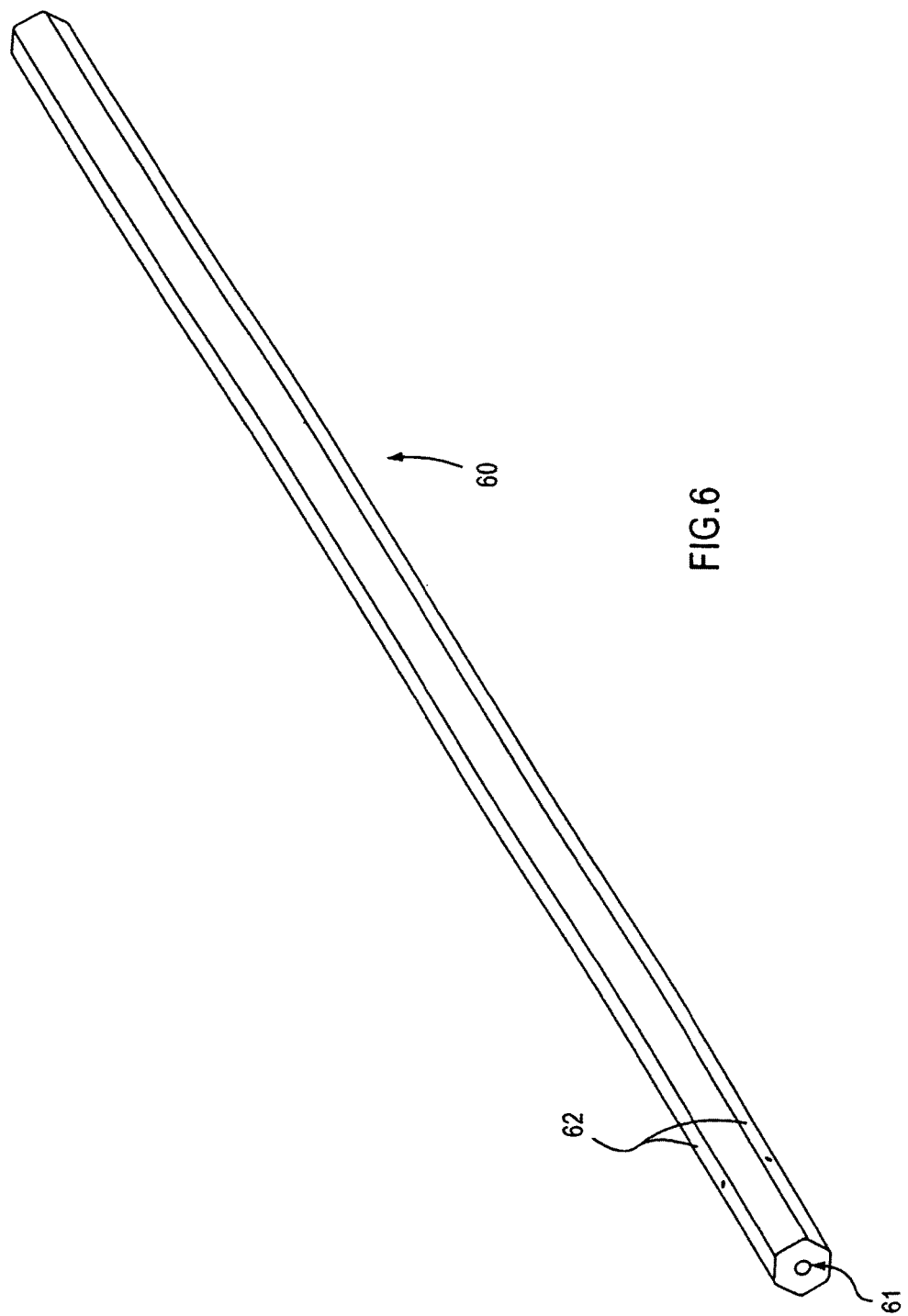
FIG. 6 is a perspective view of a central drive bar for imparting a positive traction for constructing a novel spiral wound membrane element utilizing the permeate tube of the invention.

The longitudinal opening 51 in the end fitting 50 provides longitudinal access into the interior of the positive traction permeate tube. This opening 51 is designed to accommodate a central bar that will function in a positive traction drive system to provide rotational force to provide high tension winding in applying the membrane element around the positive traction permeate tube. In the most preferred embodiment and best mode, the longitudinal opening 51 is shaped to form a regular hexagon in the center of the solid metal piece 52 of the tubular end fitting. The hexagonal longitudinal opening 51 will accommodate a hexagonal-shaped central bar 60 having an axial hole 61 for drawing a vacuum through radial holes 62 in the positive traction drive system, as shown in FIG. 6.

In the best mode, the size of the hexagonal opening in a tubular end fitting/mating element can vary, provided engagement and rotation occurs. However, in the preferred embodiment and best mode, the hexagonal opening will match the hexagonal size of the central bar 60 in the positive traction drive system. The opening in the end fitting will hold the central bar 60 that passes through the hexagonal hole in the end fitting when the positive traction permeate tube is engaged by a positive traction drive system for winding the spirally wound membrane under high tension. As will be recognized by those skilled in the art, the opening may be other than hexagonal, e.g. octagonal, etc. The required configuration of the opening and bar simply calls for the bar to engage or interlock with the opening and thereby provide positive traction.

Figure 7:
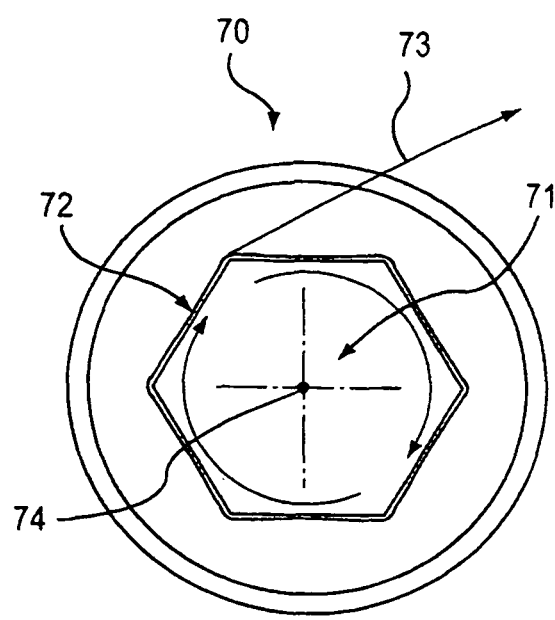
FIG. 7 is an end view of a tubular end fitting for a novel permeate tube in accordance with the invention.

In the preferred embodiment and best mode in FIG. 7, a hexagonal hole 71 in an end fitting 70 is cut or machined so that a center 74 of the hexagonal hole 71 is centered in the solid portion of the end fitting and provides longitudinal access to the interior of the positive traction permeate tube. However, the present invention also contemplates a positive traction permeate tube having end fittings with either one hole or a plurality of holes machined or cut into each end fitting for providing longitudinal access to the positive traction permeate tube interior. Any alternative hole or plurality of holes in each end fitting can be of various shapes other than a hexagon, such as a triangle, a square or other polygonal shape. These alternative embodiment holes can be centered or non-centered with or about the longitudinal axis of the tubular end fitting. Almost any shape hole in the end fitting can be practiced, provided that the hole or holes provide an edge or surface against which a rotating central bar in a positive traction drive system can develop a moment of force having a vector pointing perpendicular to and displaced from the longitudinal axis of the positive traction permeate tube when the drive system is engaged in rotating the permeate tube.

In FIG. 7, an edge 72 of the hexagonal opening 71 provides a surface against which a moment of force vector 73 is produced when a central bar is rotated. The vector 73 is perpendicular to the longitudinal axis through the center 74 of the positive traction permeate tube to which the end fitting 70 is affixed.

In the preferred embodiment each tubular end fitting/mating element is welded to an end of the central sanitary tubing component. In the most preferred embodiment the welding is accomplished by forming a full penetration butt-weld between the tubular end fitting and the central sanitary tubing component. Butt-welds are achieved when two pieces of metal are positioned coplanar and touching on one edge. When the two pieces are fused at the touching edge a butt-weld is formed. Prior to forming the butt-weld, the seams or abutment sections are first cleaned and prepared, and set on orbital welding equipment followed by welding together the central sanitary tubing component and a tubular end fitting. By securing full penetration welding, a smooth bead is formed on the interior surface of the tube. This smooth bead conforms with the 3A Sanitary Standards and requires no further grinding or polishing. After the welding is finished, a number 80 grid emery cloth is applied to roughen the outer surface of the tubes, on the glue zone at the ends (approximately 4" long), to secure good binding of the glue used to set in place the membrane leaves.

Because the permeate tube will operate as part of a spirally wound membrane element meeting closely regulated sanitary requirements, where tubing is used having a surface roughness that does not meet the sanitary standards, the surface must be machined and polished to meet the applicable 3A Sanitary Standards.

In the preferred embodiment, the positive traction permeate tube is fabricated using components having precise size tolerances for the final length and inside diameter at both ends prior to starting the manufacturing process of the membrane filtration element. As constructed, the positive traction permeate tubes provide for high tension positive traction using a positive traction drive system designed for manufacturing high tension spirally wound membrane filtration elements, while maintaining precise finished length.

The central sanitary tubing of the permeate tube is preferable perforated after welding the tubular end fittings on either end of the central sanitary tubing, as shown in FIG. 4. Perforations 46 provide access to the interior of the positive traction permeate tube. In applying the membrane element under high tension using a positive traction drive system, a vacuum can be drawn through one or both of the longitudinal openings of the positive traction permeate tube, which openings are otherwise sealed off to help maintain the integrity of the vacuum.

The vacuum provides a negative pressure on the membrane element during the positive traction high tension winding. This negative pressure helps to better adhere and compact the membrane leaves to form a membrane filtration element. Also of note, in accordance with the present invention an end fitting is welded to each of the open ends of the sanitary tubing, thereby providing a sealing surface for the ATD/interconnector required at both ends of the permeate tube.

Figure 8:
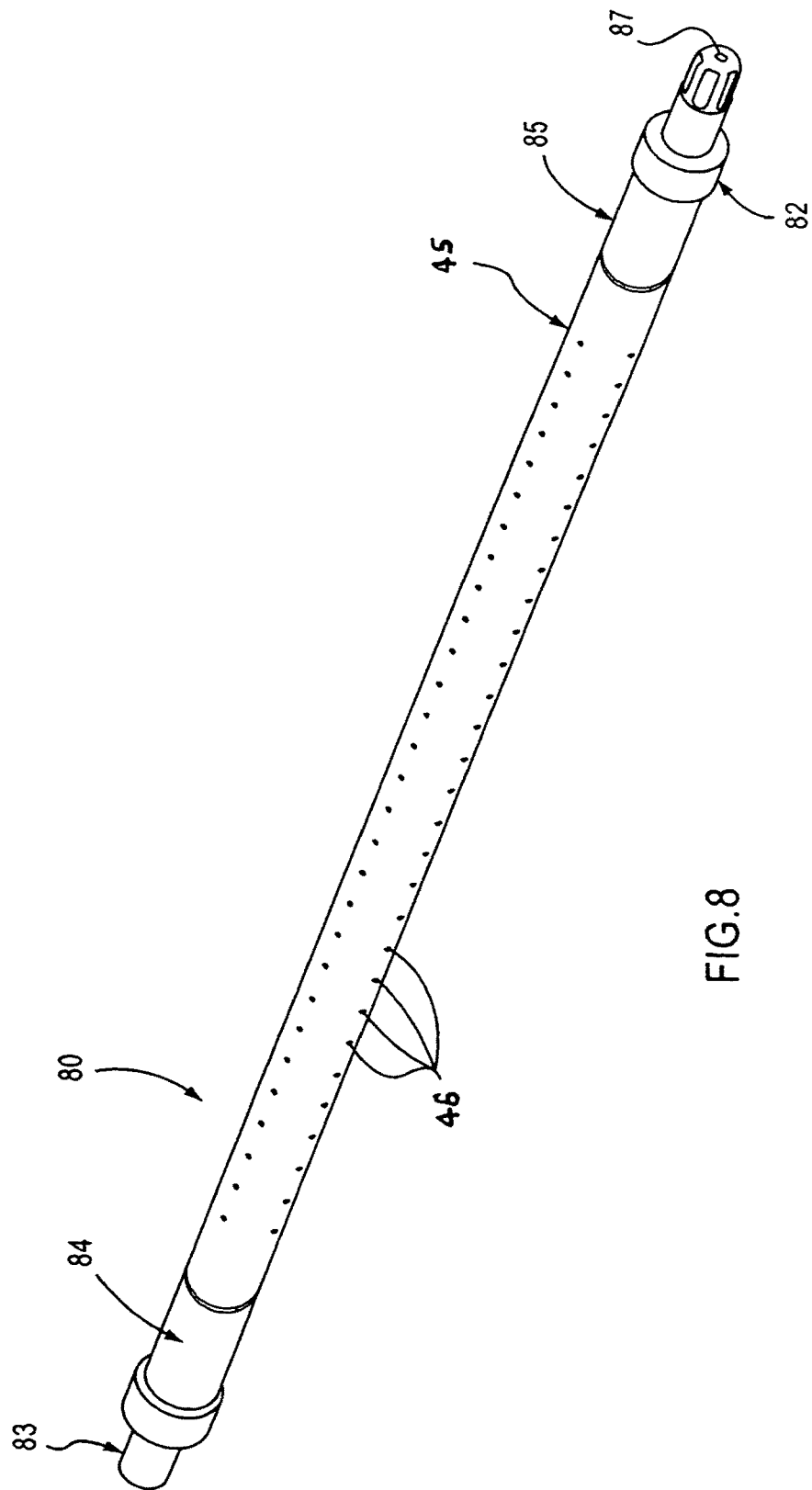
FIG. 8 is a perspective view of the permeate tube of the present invention illustrating application of the central drive bar of FIG. 6 and drive system for providing positive traction enabling production of a tightly wound spiral wound membrane element.
Figure 9:
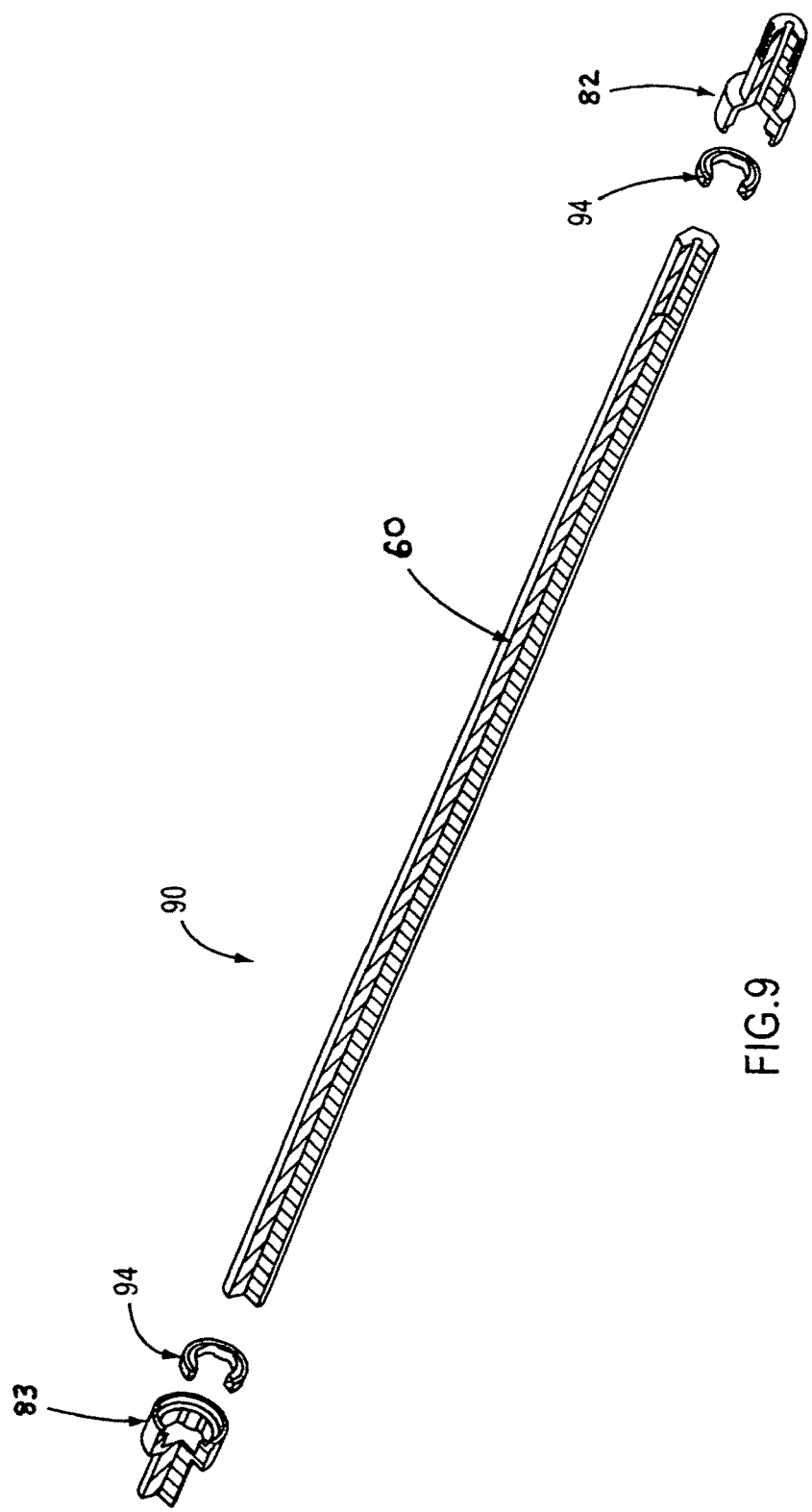
FIG. 9 is an exploded perspective view of components for a positive traction drive system for the novel permeate tube in accordance with the invention.

FIGS. 8 and 9 demonstrate a positive traction drive system 80 for rotating a positive traction permeate tube 45 having the perforations 46 during winding of the membrane element under high tension. A rolling machine (not shown) must be fitted with the drive components to rotate the positive traction permeate tube 45. A drive chuck 82 has an inner narrower cylindrical body 85 which abuts one end of the permeate tube 45. A support chuck 83 has an identical inner narrower cylindrical body 84 which abuts an opposite end of the permeate tube 45. The drive chuck 82 has an axial hole 87 through which a vacuum can be applied to an interior of the permeate tube 45. In FIG. 9, components of a positive traction drive 90, according to the preferred embodiment, include the central bar 60 that is hexagonal and two chucks that can be either the drive chuck 82 or the support chuck 83, provided that at least one of the chucks is a drive chuck. Each chuck in the preferred embodiment also has a hexagonal cap 94.

The hexagonal central bar 60 matches the longitudinal hexagonal opening in the two end fittings of the positive traction permeate tube. The central bar 60 transmits the torque generated by the rolling machine to both ends of the positive traction permeate tube. In addition, the hexagonal central bar 60 has a greater length than the positive traction permeate tube in which it is used to allow the central bar 60 to be engaged by one or more drive chucks 82. The central bar 60 may also have one or more holes to allow drawing of a vacuum in the interior of the positive traction permeate tube while engaged to the positive traction drive during winding of the membrane element. In the preferred embodiment, there is an axial hole in the central bar 60 adjoining the drive chuck 82 through which the vacuum is drawn from the permeate tube through radial holes placed nearer the center of the hexagonal central bar 60.

Figure 10:
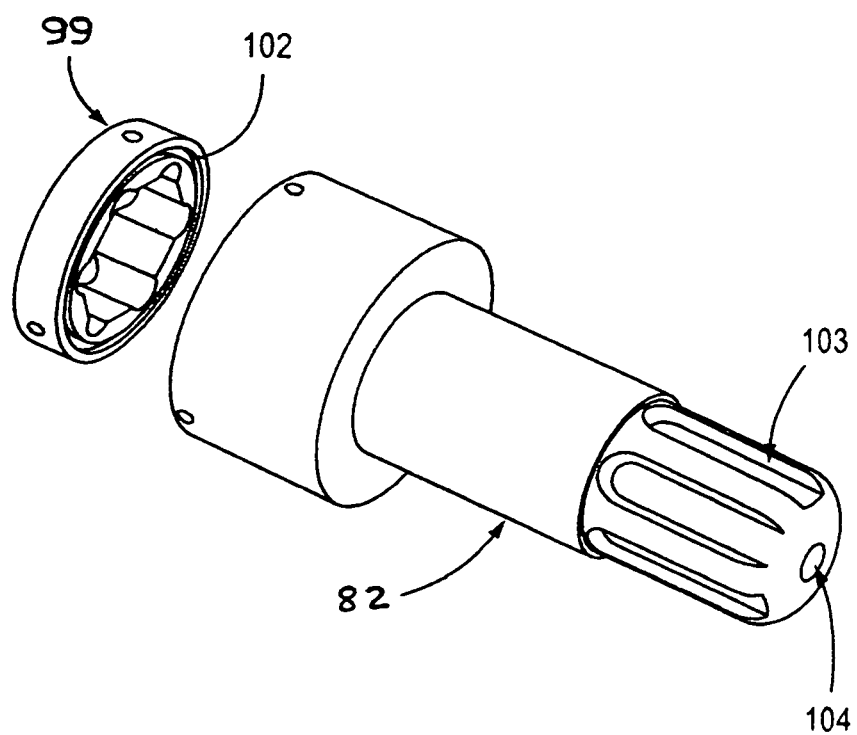
FIG. 10 is a perspective view of a drive chuck and cap for a positive traction drive system for the novel permeate tube in accordance with the invention.
Figure 11:
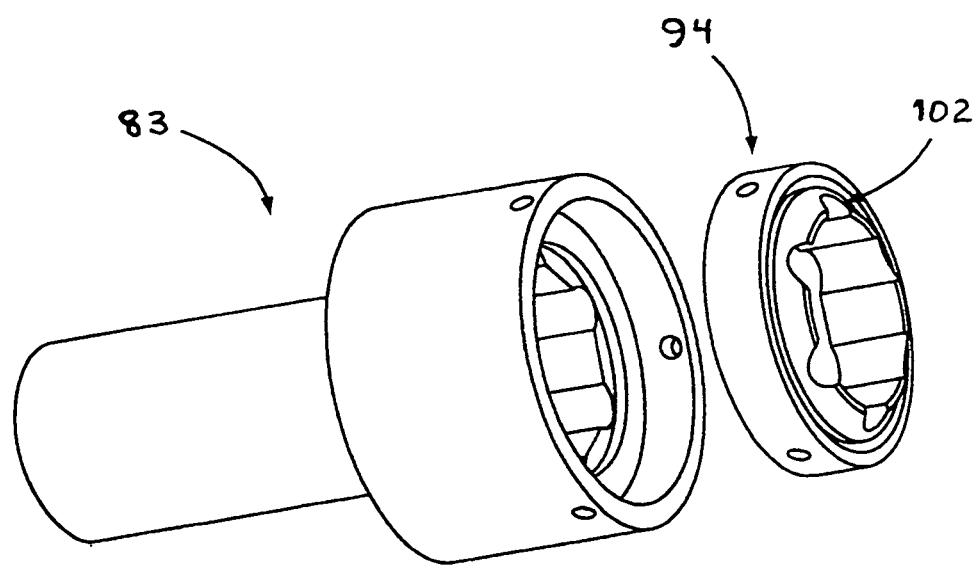
FIG. 11 is a perspective view of a support chuck and cap for a positive traction drive system for the novel permeate tube in accordance with the invention.

The drive chuck 82 and the support chuck 83 are also shown in FIGS. 10 and 11, respectively. The drive chuck 82 and any support chuck 83 connect the ends of the hexagonal central bar 60 of FIG. 9 to a rolling machine through a bushing or a bearing. The chucks 82 and 83 each hold a hexagonal cap 99 and 94, respectively, in FIGS. 10 and 11, which cap (99, 94) is a removable part, preferably made of hard plastic material. The hexagonal cap (99, 94) has two functions: (a) centering a positive traction permeate tube by mating a conical surface of the hexagonal cap (99, 94) with a chamfer on the positive traction permeate tube end; and (b) providing two grooves 102, one on each side, to allow O-rings to seal the interior of an engaged positive traction permeate tube and allow the application of the vacuum to the positive traction permeate tube interior during the rolling and tensioning process. The drive chuck 82 is very similar to the support chuck 83 in general. However, the drive chuck 82 also has a spline cut 103 or some equivalent structure to engage the drive of the rolling machine. Either chuck 82 or 83 may have a hole to allow the application of the vacuum into the positive traction permeate tube interior. In FIG. 10, an axial hole 104 for the vacuum is demonstrated.

A membrane filtration element incorporating a positive traction permeate tube may use a positive traction drive system to spirally wind a membrane element under high tension about the positive traction permeate tube under positive traction conditions. Preferably a vacuum is applied through the positive traction permeate tube from the positive traction drive system while spirally winding the membrane element.

OTHER EMBODIMENTS

In a further embodiment, the invention pertains to a positive traction permeate tube comprising (a) a sanitary tubing having a first open end, a second open end, a sanitary tubing wall defining a sanitary tubing interior and sanitary tubing exterior, a sanitary tubing longitudinal axis and a plurality of perforations in the sanitary tubing wall providing access to the sanitary tubing interior; (b) a first fitting having a longitudinal axis, the first fitting being affixed contiguous with the first open end of the sanitary tubing such that the longitudinal axis of the sanitary tubing and the longitudinal axis of the first fitting are parallel and coincident, the first fitting having a longitudinal opening cut through a solid portion of the first fitting, the longitudinal opening defined by at least one surface against which an applied force produces a moment of force having a vector perpendicular to and displaced from the longitudinal axis of the sanitary tubing and the parallel and coincident longitudinal axis of the first fitting when affixed contiguously with the first open end of the sanitary tubing, and (c) a second fitting having a longitudinal axis, the second fitting being affixed contiguous with the second open end of the sanitary tubing such that the longitudinal axis of the sanitary tubing and the longitudinal axis of the second fitting are parallel and coincident, the second fitting having a longitudinal opening cut through a solid portion of the second fitting, the longitudinal opening defined by at least one surface against which an applied force produces a moment of force having a vector perpendicular to and displaced from the longitudinal axis of the sanitary tubing and the parallel and coincident longitudinal axis of the second fitting when affixed contiguously with the open end of the sanitary tubing.

In other embodiments the invention pertains to a tube wherein the permeate tube is defined by an outer diameter having a circular cross-section; wherein the permeate tube comprises stainless steel; wherein the permeate tube comprises 316L stainless steel; wherein the permeate tube components are welded together; wherein the permeate tube components are welded together using full penetration butt-welding; and wherein the permeate tube has a polished surface in accordance with 3A Sanitary Standards.

In another embodiment, the invention pertains to a method of making a positive traction permeate tube comprising: (a) providing (1) a sanitary tubing having a first open end, a second open end, a sanitary tubing wall defining a sanitary tubing interior and sanitary tubing exterior, a plurality of perforations in the sanitary tubing providing access to the sanitary tubing interior, and a sanitary tubing longitudinal axis; (2) a first fitting having a longitudinal axis and a solid portion for a longitudinal opening; (b) cutting a longitudinal opening through the solid portion of the first fitting, the longitudinal opening defined by at least one surface against which an applied force produces a moment of force having a vector perpendicular to and displaced from the longitudinal axis of the first fitting; (c) affixing the sanitary tubing and the first fitting to each other contiguously along the first open end of the sanitary tubing such that the longitudinal axis of the sanitary tubing and the longitudinal axis of the first fitting are parallel and coincident; (d) providing a second fitting having a longitudinal axis and a solid portion for a longitudinal opening; (e) cutting a longitudinal opening through the solid portion of the second fitting, the longitudinal opening defined by at least one surface against which an applied force produces a moment of force having a vector perpendicular to and displaced from the longitudinal axis of the second fitting; and (f) affixing the sanitary tubing with the second fitting to each other contiguously along the second open end of the sanitary tubing such that the longitudinal axis of the sanitary tubing and the longitudinal axis of the second fitting are parallel and coincident to form a positive traction permeate tube. In other embodiments, the invention pertains to a method of making a positive traction permeate tube wherein the affixing is accomplished by welding; wherein the affixing is accomplished by full penetration butt-welding; and further comprising polishing the positive traction permeate tube when needed to comply with 3A Sanitary Standards.

In another embodiment the invention pertains to a permeate tube device for spirally wrapped membrane elements comprising a) a hollow tubular element having an inside wall and an outside wall and a first end and a second end; b) a first positive traction device affixed to said first end; (c) a second positive traction device affixed to said second end; and d) a plurality of holes connecting said inside wall with said outside wall. The hollow tubular element is preferably a stainless steel substantially cylindrical element to which the positive traction devices, also made of stainless steel, are welded, most preferably by full penetration welding utilizing orbital welding equipment.

In another embodiment the invention pertains to a substrate apparatus for a spirally wrapped membrane element comprising a) a positive traction torque device having a means for positive engagement to precisely control the rotational position and amount of torques imparted to said positive traction torque device; b) a permeate tube having both ends permanently attached to each of a pair of said positive traction torque devices; and c) a plurality of holes in said permeate tube which in conjunction with the composition of said permeate tube has a torque capacity equal to or greater than the torque of said positive traction torque device.

In another embodiment the invention pertains to a permeate tube device having first and second open ends and having holes therein for use as a substrate of a spirally wrapped membrane element wherein the improvement comprises first and second positive traction torque devices welded to said first and second open ends of the permeate tube having a mating mechanism to precisely control the rotational position and torque imparted to the tube.

In still another embodiment, the invention pertains to a positive traction, permeate tube comprising: (a) a sanitary tubing having a first open end, a second open end, a sanitary tubing wall defining a sanitary tubing interior and substantially circular sanitary tubing exterior, a sanitary tubing longitudinal axis and a plurality of perforations in said sanitary tubing wall providing access to said sanitary tubing interior; (b) a first fitting having a longitudinal axis, said first fitting being affixed contiguous to said first open end of said sanitary tubing such that said longitudinal axis of said sanitary tubing and said longitudinal axis of said first fitting are parallel and coincident, said first fitting having a longitudinal opening cut through a solid portion of said first fitting, said longitudinal opening being defined by at least one surface against which an applied force produces a moment of force having a vector substantially perpendicular to and displaced from said longitudinal axis of said sanitary tubing and said parallel and coincident longitudinal axis of said first fitting when affixed contiguously to said first open end of said sanitary tubing; and (c) a second fitting having a longitudinal axis, said second fitting being affixed contiguous to said second open end of said sanitary tubing such that said longitudinal axis of said sanitary tubing and said longitudinal axis of said second fitting are parallel and coincident, said second fitting having a longitudinal opening cut through a solid portion of said second fitting, said longitudinal opening being defined by at least one surface against which an applied force produces a moment of force having a vector substantially perpendicular to and displaced from said longitudinal axis of said sanitary tubing and said parallel and coincident longitudinal axis of said second fitting when affixed contiguous to said second open end of said sanitary tubing.

In still yet other embodiments, the invention pertains to a permeate tube of wherein said permeate tube is defined by an outer diameter having a substantially circular cross-section; wherein said permeate tube comprises stainless steel; wherein said permeate tube comprises 316L stainless steel; wherein said first and second fittings are affixed to said sanitary tubing by full penetration butt welding; wherein said permeate tube has a polished surface as required by 3A Sanitary Standards for sanitary applications; wherein said first and second fittings are affixed to said sanitary tubing by full penetration automatic orbital welding and said permeate tube has a polished surface as required by 3A Sanitary Standards for sanitary applications; wherein said plurality of perforations in said sanitary tubing wall are arranged at diametrically opposing loci of the sanitary tubing wall; or wherein the perforations are arranged in at least four rows running longitudinally along a substantial portion of the length of the sanitary tubing wall.

In yet still other embodiments, the invention pertains to a method of making a stainless steel positive traction permeate tube comprising: (a) utilizing a stainless steel sanitary tube having a polished surface as required by 3A Sanitary Standards for sanitary applications and having a first open end, a second open end, a sanitary tubing wall defining a sanitary tubing interior and a sanitary tubing exterior, a plurality of perforations in said sanitary tubing wall providing access to said sanitary tubing interior, and a sanitary tubing longitudinal axis; (b) employing a first fitting having a polygonal opening with a longitudinal axis and a solid portion for a longitudinal opening having a polished surface as required by 3A Sanitary Standards for sanitary applications; (c) employing a second fitting having a polygonal opening with a longitudinal axis and a solid portion for a longitudinal opening having a polished surface as required by 3A Sanitary Standards for sanitary applications; (d) welding said first open end of said sanitary tubing and said first fitting to each other contiguously along said first open end of said sanitary tubing such that said longitudinal axis of said sanitary tubing and said longitudinal axis of said first fitting are parallel and coincident; and (e) welding said second open end of said sanitary tubing and said second fitting to each other contiguously along said second open end of said sanitary tubing such that said longitudinal axis of said sanitary tubing and said longitudinal axis of said second fitting are parallel and coincident to form said positive traction permeate tube; or also wherein the welding is accomplished by full penetration butt-welding; or wherein said first and said second fittings are welded to said sanitary tubing by full penetration automatic orbital welding.

In another embodiment, the invention pertains to a positive traction permeate tube for spirally wrapped membrane elements comprising: (a) a substantially cylindrical hollow tubular element having an inside wall, a cylindrical outside wall, a first open end and a second open end; (b) a first positive traction device affixed to said first open end, (c) a second positive traction device affixed to said second open end; and (d) a plurality of holes connecting said inside wall with said outside wall.

In yet another embodiment, the invention pertains to a positive traction permeate tube wherein said substantially cylindrical hollow tubular element is a sanitary stainless steel element and first and second positive traction devices are composed of sanitary stainless steel meeting the 3A Sanitary Standards for sanitary applications and said first and second positive traction devices are affixed to said first and second open ends respectively by a full penetration butt-weld.

In yet another embodiment, the invention pertains to a cylindrical sanitary fitting for affixation at an open end of a sanitary perforated cylindrical tube adapted to accept an anti-telescoping device and engage a drive bar comprising: (a) a substantially cylindrical sanitary fitting having an interior end having a face defined by a plane perpendicular to the axis of the fitting and an opening coaxial with the fitting; (b) an exterior end having a face defined by a plane perpendicular to the axis of the fitting and a cylindrical opening, coaxial with the fitting providing a cylindrical inner surface adapted to accept an anti-telescoping device with a sealing device; and (c) an intermediate section between said interior and exterior ends having a polygonal opening coaxial with the fitting adapted to engage a drive bar to achieve positive traction.

And in yet other embodiments, the invention pertains to a cylindrical sanitary fitting wherein said cylindrical sanitary fitting is comprised of stainless steel meeting the requirements of 3A Sanitary Standards for sanitary applications; wherein the cylindrical sanitary fitting is a machined solid block; wherein the stainless steel fitting is composed of 316L stainless steel; wherein the stainless steel fitting is composed of 304 stainless steel or wherein said polygonal opening is hexagonal.

In yet another embodiment, the invention pertains to a permeate tube device for spirally wrapped membrane elements comprising: a) a hollow substantially cylindrical stainless steel tubular element having an inside wall and an outside wall and a first end and a second end; b) a first positive traction device having an anti-telescoping device opening disposed at or near one end and a polygonal: shaped mating opening disposed at or near the other end, said first positive traction device affixed to said first end of said hollow tubular member; c) a second positive traction device having an anti-telescoping device opening disposed at or near one end and a polygonal-shaped mating opening disposed at or near the other end, said second positive traction device affixed to said second end of said hollow tubular member; and d) a plurality of holes connecting said inside wall with said outside wall of said substantially cylindrical sanitary stainless steel hollow tubular element; or wherein the anti-telescoping device openings are cylindrical openings; or wherein said first and second traction devices are affixed to said sanitary stainless steel substantially cylindrical tubular elements by a full penetration butt-weld.

In yet another embodiment, the invention pertains to a positive traction permeate tube over which a spirally wrapped membrane element may be formed comprising: a) a first positive traction torque device having a means for positive engagement to precisely control the rotational position and amount of torques imparted to said positive traction torque device; b) a second positive traction torque device having means for positive engagement to precisely control the rotational position and amount of torque imparted to said positive traction torque device; c) a permeate tube having a first end permanently attached to said first positive traction torque device and a second end permanently attached to said second positive traction torque device; and d) a plurality of holes in said permeate tube which in conjunction with the chemical composition of said permeate tube has a torque capacity equal to or greater than the torque of said positive traction torque device.

It will be recognized the invention is capable of numerous changes and modifications by those skilled in the art. These and such other variations are intended to be included in the scope of the appended claims. As used herein and in the following claims, the word 'tube' is not limited according to its technical sense to mean a perfect cylindrical passage defined by a circular cross-section. The outer cross-section, however, must be substantially circular because the membrane element must be "substantially" cylindrical in order to provide a good fit inside the pressure vessel in which the membrane element is housed during use.

As used herein and in the following claims, the word 'comprising' or 'comprises' is used in its technical sense to mean the enumerated elements include but do not exclude additional elements which may or may not be specifically included in the dependent claims. It will be understood that such additions, whether or not included in the dependent claims, are modifications which can be made within the scope of the invention. It will be appreciated by those skilled in the art that a wide range of changes and modifications can be made to the invention without departing from the spirit and scope of the invention as defined in the following claims.

| CHART OF ELEMENTS | |
|---|---|
| Number | Description |
| 10 | prior art spiral-wound membrane filtration element |
| 11 | prior art plastic permeate tube |
| 12 | membrane element |
| 15 | notch in prior art plastic permeate tube |
| 31 | central stainless steel sanitary tubing |
| 32 | stainless steel sanitary end fitting/mating element |
| 34 | sanitary tubing end |
| 38 | first device opening for ATD |
| 39 | second device opening for ATD |
| 45 | novel permeate tube according to invention best mode |
| 46 | perforation in permeate tube |
| 50 | finished tubular end fitting/mating element |
| 51 | longitudinal opening |
| 52 | solid metal piece |
| 53 | outer wall |
| 54 | fitting longitudinal axis |
| 60 | central bar |
| 61 | central bar axial hole |
| 62 | central bar radial hole |
| 70 | end fitting with hexagonal opening/hole |
| 71 | hexagonal opening/hole |
| 72 | edge of hexagonal opening/hole |
| 73 | moment of force vector |
| 74 | longitudinal axis through center of permeate tube |
| 80 | drive system and permeate tube |
| 81 | permeate tube on drive system |
| 82 | drive chuck |
| 83 | support chuck |
| 84 | outer cylindrical body of the drive chuck |
| 85 | outer cylindrical body of the support chuck |
| 87 | axial hole for vacuum connection |
| 90 | drive system |
| 94 | hexagonal cap |
| 99 | hexagonal cap |
| 102 | groove for O-ring |
| 103 | spline cut |
| 104 | chuck axial hole for vacuum connection |

What is claimed is:

1. A permeate tube with a spirally wrapped membrane comprising:
   (a) a positive traction stainless steel hollow tube having a first open end, a second open end, an inside wall and substantially circular stainless steel tube exterior with a longitudinal axis having a plurality of perforations in said positive traction stainless steel hollow tube to provide a direct communication between the inside wall and the substantially circular stainless steel tube exterior;
   (b) a first positive traction fitting having a longitudinal axis and a longitudinal opening with an anti-telescoping device opening to prevent telescoping and a polygonal-shaped opening disposed within said longitudinal opening with the polygonal-shaped opening having a cross section being defined by at least one internal side surface of the first positive traction fitting, said first positive traction fitting being affixed contiguous, parallel and coincident to said first open end of said positive traction stainless steel hollow tube;
   (c) a second positive traction fitting having a longitudinal axis and a longitudinal opening with an anti-telescoping device opening to prevent telescoping and a polygonal-shaped opening disposed within said longitudinal opening with the polygonal-shaped opening having a cross section being defined by at least one internal surface of the second positive traction fitting, said second positive traction fitting being affixed contiguous, parallel and coincident to said second open end of said positive traction stainless steel hollow tube;
   (d) an inner central bar having a polygonal-shaped cross section with an axial hole therethrough and radial holes connected to the axial hole in the inner central bar for drawing a vacuum through radial holes therein said inner central bar having a polygonal-shaped cross section to mate with the polygonal-shaped opening in the first positive traction fitting and the second positive traction fitting; and
   (e) the spirally wrapped membrane, wrapped around the positive traction stainless steel hollow tube with a torque or tightness controlled by the first positive traction fitting, the second positive traction fitting and the inner central bar wherein said spirally wrapped membrane element is prevented from telescoping by the first and second positive traction fitting having the anti-telescoping device opening.

2. The permeate tube of claim 1 wherein said polygonal-shaped cross-section of the inner central bar is hexagonal.

3. The permeate tube of claim 1 wherein said positive traction stainless steel hollow tube comprises 316L stainless steel.

4. The permeate tube of claim 3 wherein said first and second positive traction fittings are affixed to said positive traction stainless steel hollow tube by full penetration automatic orbital welding and said permeate positive traction stainless steel hollow tube has a polished surface.

5. The permeate tube of claim 4 wherein the plurality of perforations are arranged in at least four rows running longitudinally along a substantial portion of the length of the positive traction stainless steel hollow tube.

6. The permeate tube of claim 1 wherein said positive traction stainless steel hollow tube comprises 304 stainless steel.

7. The permeate tube of claim 1 wherein said first and second positive traction fittings are affixed to said positive traction stainless steel hollow tube by full penetration butt welding.

8. The permeate tube of claim 1 wherein said positive traction stainless steel hollow tube has a polished surface.

9. The permeate tube of claim 1 wherein said plurality of perforations in said positive traction stainless steel hollow tube are arranged at diametrically opposing loci the positive traction stainless steel hollow tube.

10. A method of making a permeate tube with a wrapped membrane as in claim 1 comprising:
    (a) utilizing the positive traction stainless steel hollow tube having a polished surface;
    (b) employing the first positive traction fitting with the longitudinal axis and with the longitudinal opening's solid portion having a polished surface and with the polygonal-shaped opening having a nontapered, mating cross section defined by at least one internal side surface against which an applied force produces a moment of force having a vector substantially perpendicular to and displaced from said longitudinal axis of the first positive traction fitting;
    (c) employing the second positive traction fitting with the longitudinal axis with the longitudinal opening's solid portion having a polished surface and with the polygonal-shaped opening having a nontapered, mating cross section defined by at least one internal side surface against which an applied force produces a moment of force having a vector substantially perpendicular to and displaced from said longitudinal axis of the second positive traction fitting;

(d) welding said first open end of said positive traction stainless steel hollow tube and said first positive traction fitting to each other contiguously along said first open end of said positive traction stainless steel hollow tube such that the longitudinal axis of said positive traction stainless steel hollow tube and said longitudinal axis of said first positive traction fitting are parallel and coincident;

(e) welding said second open end of said positive traction stainless steel hollow tube and said second positive traction fitting to each other contiguously along said second open end of said positive traction stainless steel hollow tube such that the longitudinal axis of said positive traction stainless steel hollow tube and said longitudinal axis of said second positive traction fitting are parallel and coincident to form said permeate tube;

(f) accommodating the inner central bar by the permeate tube's longitudinal opening of the first positive traction fitting and the longitudinal opening of the second positive traction fitting, said inner central bar having a polygonal-shaped cross section to mate with the polygonal-shaped opening in the first positive traction fitting and the polygonal-shaped opening in the second positive traction fitting, the inner central bar with the axial hole therethrough for drawing a vacuum through radial holes therein; and (g) drawing vacuum through the axial hole of the inner central bar, through the radial holes of the inner central bar, and through the permeate tube and, spirally winding a membrane element around the permeate tube to form the permeate tube with the wrapped membrane.

11. The method of making according to claim 10 wherein the welding is accomplished by full penetration butt-welding.

12. The method of making according to claim 10 wherein said first positive traction fitting and said second positive traction fitting are welded to said positive traction stainless steel hollow tube by full penetration automatic orbital welding.

13. The method of making according to claim 10 wherein the polygonal-shaped cross section of the inner central bar and the polygonal-shaped opening of the first positive traction fitting and the polygonal-shaped opening of the second positive traction fitting are hexagonal.

14. A positive traction permeate tube for spirally wrapped membrane element comprising:
(a) a substantially cylindrical hollow tubular element having an inside wall, a cylindrical outside wall, a first open end and a second open end;
(b) a first positive traction device having a longitudinal opening with an anti-telescoping device opening to prevent telescoping of the spirally wrapped membrane element and a polygonal-shaped opening disposed in or near the longitudinal opening said first positive traction device affixed to said first open end of the substantially cylindrical hollow tubular element;
(c) a second positive traction device having a longitudinal opening with an anti-telescoping device opening to prevent telescoping of the spirally wrapped membrane element and a polygonal-shaped opening disposed in or near the longitudinal opening said second positive traction device affixed to said second open end of the substantially cylindrical hollow tubular element:
(d) a plurality of holes through the substantially cylindrical hollow tubular element connecting said inside wall with said cylindrical outside wall of the substantially cylindrical hollow tubular element;
(e) an inner central bar being accommodated by the longitudinal opening in each of the first and second positive traction device and the inner central bar having a polygonal-shaped cross section to mate with the first positive traction device's polygonal-shaped opening and the second positive traction device's polygonal-shaped opening, the inner central bar having an axial hole and radial holes therethrough to connect the axial hole with the radial holes to draw a vacuum through the radial holes therein; and
(f) wherein the spirally wrapped membrane element has its torque or tightness around the substantially cylindrical hollow tubular element controlled by the tension on the first positive traction device, the second positive traction device and the inner central bar and its anti-telescoping controlled by the first and second positive traction fitting having the anti-telescoping device opening.

15. The positive traction permeate tube of claim 14 wherein said substantially cylindrical hollow tubular element is a stainless steel element, said first and second positive traction device are composed of stainless steel and said first and second positive traction device are affixed to said first open end and said second open end of the substantially cylindrical hollow tubular element by a full penetration butt-weld.

16. The positive traction permeate tube of claim 14 wherein the polygonal-shaped cross section of the inner central bar is hexagonal.

17. A positive traction permeate tube, over which a spirally wrapped membrane element is formed, comprising:
(a) a first positive traction torque device having a longitudinal opening with an anti-telescoping device opening to prevent telescoping and a polygonal-shaped opening disposed at or near one end of the longitudinal opening, the polygonal-shaped opening having a cross section defined by at least one internal side surface of the first positive traction torque device to provide for a precise control of the rotational position and amount of torque imparted to said first positive traction torque device;
(b) a second positive traction torque device having a longitudinal opening with an anti-telescoping device opening to prevent telescoping and a polygonal-shaped opening disposed at or near one end of the longitudinal opening, the polygonal-shaped opening having a cross section defined by at least one internal side surface of the second positive traction torque device to provide for a precise control of the rotational position and amount of torque imparted to said second positive traction torque device;
(c) a tubular element having a hollow interior and an exterior winding surface and a first end attached to said first positive traction torque device and a second end attached to said second positive traction torque device;
(d) a plurality of holes in the exterior winding surface of said tubular element with a direct communication to the hollow interior and the spirally wrapped membrane element on the exterior winding surface of said tubular element; and (e) an inner central bar having a polygonal-shaped cross section to mate with the polygonal-shaped opening in the first positive traction torque device and the polygonal-shaped opening in the second positive traction torque device said inner central bar having an axial hole and radial holes therethrough for drawing a vacuum through radial holes therein;

wherein the torque or tightness of the spirally wrapped membrane element around the tubular element is controlled by the inner central bar and by the first positive traction torque device and the second positive traction torque device and its anti-telescoping controlled by the anti-telescoping device opening of the first and second positive traction torque device.

18. The positive traction permeate tube of claim 17 wherein said first positive traction torque device and said second positive traction torque device are affixed to said tubular element by full penetration butt welding.

19. The positive traction permeate tube of claim 18 wherein said first positive traction torque device's polygonal-shaped opening is hexagonal and said second positive traction torque device's polygonal-shaped opening is hexagonal.

20. The positive traction permeate tube of claim 19 wherein the cross section of the inner central bar is hexagonal.

21. The positive traction permeate tube of claim 17 wherein the polygonal-shaped cross section of the inner central bar and the polygonal-shaped opening in the first positive traction torque device and the polygonal-shaped opening in the second positive traction torque device are hexagonal.

\* \* \* \* \*